United States Patent [19]

Takahashi et al.

[11] Patent Number: 4,564,088

[45] Date of Patent: Jan. 14, 1986

[54] AXIAL BRAKING DEVICE

[75] Inventors: Mikio Takahashi; Motoichi Nakayama, both of Toyota, Japan

[73] Assignee: Kyoho Machine Works, Ltd., Aichi, Japan

[21] Appl. No.: 569,452

[22] Filed: Jan. 9, 1984

[51] Int. Cl.[4] .............................................. B65H 59/10
[52] U.S. Cl. ........................................ 188/67; 74/531; 92/29; 188/166; 188/170; 403/372
[58] Field of Search ................. 188/67, 170, 166, 167; 92/75, 29; 248/161, 411; 403/366, 372; 74/531

[56] References Cited

U.S. PATENT DOCUMENTS

| | | | |
|---|---|---|---|
| 1,637,383 | 8/1927 | Livergood | 188/67 X |
| 2,988,058 | 6/1961 | Warnecke | 188/67 X |
| 3,009,747 | 11/1961 | Pitzer | 188/67 |
| 3,176,590 | 8/1965 | Uhtenwoldt et al. | 188/67 |
| 3,203,513 | 8/1965 | Allen | 188/170 |
| 3,643,765 | 2/1972 | Hanchen | 188/67 X |
| 3,805,679 | 4/1974 | Wray | 92/29 X |
| 3,828,893 | 8/1974 | Clark | 188/67 |

FOREIGN PATENT DOCUMENTS

| | | | |
|---|---|---|---|
| 1296934 | 6/1969 | Fed. Rep. of Germany | 188/67 |
| 1965077 | 7/1971 | Fed. Rep. of Germany | 74/531 |
| 2034800 | 6/1980 | United Kingdom | 188/170 |

Primary Examiner—George E. A. Halvosa
Attorney, Agent, or Firm—Parkhurst & Oliff

[57] ABSTRACT

A braking device for arresting an axial relative movement between a bearing, and a shaft slidably engaging the bearing and extending through a cylinder which is axially immovable to the bearing. The device comprises: an annular piston slidably received in the cylinder and slidably engaging the shaft; a brake shoe engaging the shaft axially immovably relative to the cylinder and radially contractible to apply a brake to the shaft; a resilient radial clamp member engaging the outer surface of the brake shoe, axially compressible by axial movement of the annular piston and thereby reduced in inside diameter to force the brake shoe against the surface of the shaft; and a piston driving device for moving the shaft along its axis through a controlled selective supply of a pressurized fluid to the cylinder. The piston driving device may comprise a coil spring to bias the piston to cause an axial compression of the radial clamp member, and a device for effecting the controlled supply of the fluid. The shaft may be normally arrested or released by appropriate arrangement of the piston driving device.

9 Claims, 11 Drawing Figures

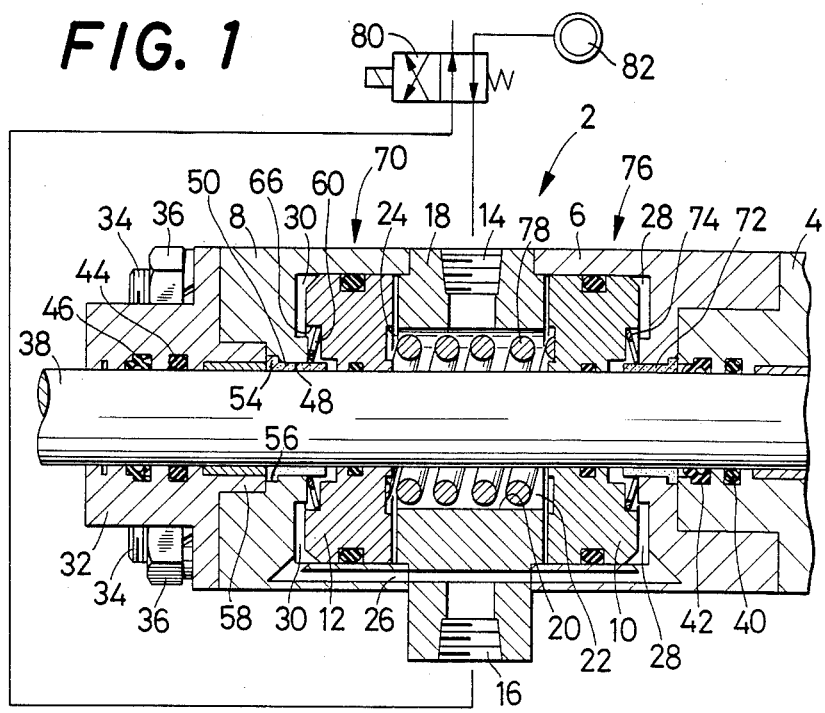

AXIAL BRAKING DEVICE

BACKGROUND OF THE INVENTION

The present invention relates to an axial braking device for arresting a relative movement between a bearing unit or assembly, and a shaft member slidably engaging the bearing assembly and movable axially thereof relative to the bearing assembly.

In various fields of art, it is frequently required to arrest or stop a shaft, rod or similar body, during its movement along its axis, at a predetermined position along the axis. A typical example of a member having such an axially moving body is an air cylinder which uses air as a working fluid. As the air is compressible, a piston rod of the cylinder can not be stopped instantaneously when the supply of air under pressure is cut off, and consequently can not be accurately located at the desired position. In view of this fact, it has been commonly practiced in the art to use a fixed stop which is adapted to abut on the piston rod or a suitable member fixed to the piston rod, and thus stop the piston rod at an intended position with considerably high positioning accuracy. However, the positioning by use of such stop means suffers a difficulty of changing, as desired, the position at which the moving member is to be stopped. Thus, there has been a need for arresting an axially moving member exactly at a desired position along the axis. This need also exists for many other purposes. For example, in an arrangement wherein a carriage is moved while being guided by a stationary guiding rod or rods, it is needed to apply a brake for stopping a relative movement between the carriage and the guiding rods so that the carriage is positioned at a selected position as if it were fixed integrally to a base frame to which the guiding rods are secured.

SUMMARY OF THE INVENTION

It is accordingly an object of the present invention which was developed to meet the above indicated need, to provide an axial braking device which is structurally simple and compact, and capable of providing a high operational response, a sufficient braking force, and an improved positioning accuracy.

According to the present invention, there is provided an axial braking device for arresting a relative movement between bearing means, and a shaft member slidably engaging the bearing means and movable axially thereof relative to the bearing means. The instant axial braking device comprises: (a) a cylinder which is disposed immovably along an axis thereof relative to the bearing means, and through which the shaft member extends along the axis thereof; (b) an annular piston having a central bore to define an inner surface thereof and received within the cylinder, the annular piston engaging the cylinder fluid-tightly and slidably at an outer surface thereof and further engaging the shaft member fluid-tightly and slidably at the inner surface; (c) a cylindrical brake shoe having at least one slit formed axially thereof and through a wall thickness thereof, and radially contractible, the cylindrical brake shoe slidably engaging the shaft member and being disposed immovably relative to the cylinder along the axis of the latter; (d) a radial clamp member of generally coned disc shape made of a resilient material, and engaging the outer surface of the cylindrical brake shoe, the radial clamp member being compressible in a direction along the axis of the cylinder by the annular piston and thereby reduced in inside diameter thereof so as to radially force the inner surface of the cylindrical brake shoe against the outer surface of the shaft member; and (e) piston drive means for moving the annular piston along the axis of the cylinder through a controlled selective supply of a pressurized fluid to the cylinder.

The term "bearing means" used herein should be interpreted so broadly as to include a portion or portions of a moving member which slidably engage(s) a fixed shaft member or members as well as an ordinary stationary bearing or bearing assembly which slidably supports an axially moving shaft member. The term "cylinder" disposed immovably relative to the "bearing means" should be interpreted to mean a cylinder which includes not only a cylinder tube but also cylinder covers closing opposite ends of the cylinder and which is supported by a separate bearing unit, but also mean a cylinder, one or both of the cylinder covers of which is (are) used as the "bearing means" to support the cylinder.

In the braking device constructed as described above, a brake shoe is forced against a shaft member by a simply-constructed small-sized radial clamp member. Therefore, the braking device may be simplified and small-sized in overall structure, and economical to manufacture. In addition, the instant braking device has an improved operational response, since the radial clamp member is a kind of coned disc spring (belleville spring) which is capable of urging or forcing the brake shoe into its operated position with an extremely small amount of operating stroke or travel of a piston. This reduced requirement of the piston travel means a reduced volume of a pressure chamber in the cylinder, and consequently mimimizes an operational time lag or delay due to compressibility of a working fluid even when a compressible gas (air) is employed. Thus, the operational response is further improved. Another advantage of the instant braking device lies in its operational bidirectionality provided by a combination of the radial clamp member and the cylindrical brake shoe. This bidirectionality is not obtained when a radial clamp member of coned disc spring type directly acts on the shaft member because the coned disc spring has a determinate operational directionality, i.e., capable of arresting the shaft member only when it is moving in predetermined one of the opposite axial directions. In the instant braking device, however, the above known limitation in operating direction of a coned disc type of clamp member is eliminated by the use of the radial clamp member in combinative cooperation with the brake shoe which is disposed such that its axial movements relative to the cylinder is not possible. Accordingly, the present braking device is capable of arresting the shaft member irrespective of the direction in which it is moving along its axis.

BRIEF DESCRIPTION OF THE DRAWINGS

The above and other objects, features and advantages of the present invention will become manifest to those versed in the art with reference to the ensuing detailed description of the preferred embodiments, and the accompanying drawings in which:

FIG. 1 is a front elevational view in cross section of one embodiment of a normally-operated braking device of the invention;

FIG. 2 is a front view in elevation of a brake shoe employed in the braking device of FIG. 1;

FIG. 3 is a front view in elevation of a radial clamp member employed in the braking device of FIG. 1;

FIG. 4 is a fragmentary cross sectional view in enlargement of a part of the braking device of FIG. 1 in the vicinity of the radial clamp member;

FIG. 5 is a front elevational view partly in cross section of an embodiment of a normally-released braking device of the invention;

DETAILED DESCRIPTION OF THE PREFERRED EMBODIMENTS

Figure 6:
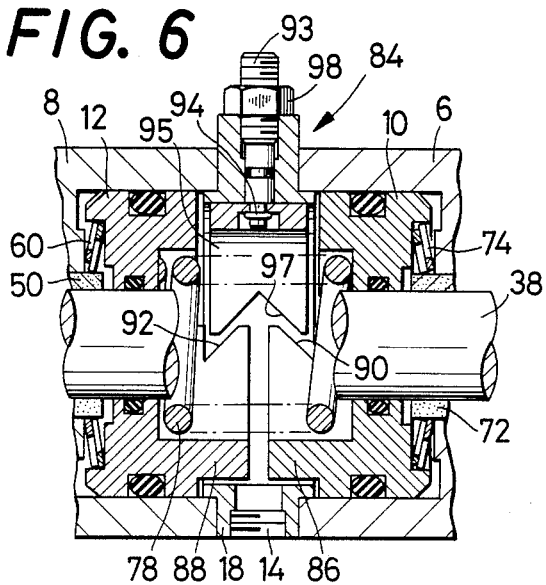
FIG. 6 is a front elevational view in cross section of a further embodiment of the normally-operated braking device.

Referring to the accompanying drawings, several preferred embodiments of the invention will be described hereinafter.

There is first shown in FIG. 1 an example of a braking device for arresting a piston rod of an air cylinder assembly at a selected position along the axis thereof. The braking device fixed to the air cylinder assembly comprises a cylinder 2, which constitutes the body of the braking device. The cylinder 2 is removably attached to a first cylinder cover 4 which is a rod-end cover of the air cylinder assembly. The cylinder 2 is of square shape in transverse cross section, and comprises a first cylinder tube 6 and a second cylinder tube 8. These cylinder tubes 6, 8 are provided with cylindrical portions defining a pair of opposed axial bores which are open at one end of the cylindrical portions. These cylinder tubes 6, 8 accommodate respective first and second annular pistons 10 and 12, which are slidable in the axial bores in an air-tight manner.

Between the opposed axial ends of the first and second cyliner tubes 6 and 8 on the open-end sides of the axial bores, there is disposed a fitting 18 which has a first port 14 and a second port 16. The fitting 18 further has a central through-bore 20 through which the first port 14 is held in communication with inner pressure chambers 22 and 24 each formed on the inner side of the respective annular piston 10, 12. A passage 26 is formed through the fitting 18, and through the first and second cylinder tubes 6 and 8. The second port 16 is in communication with outer pressure chambers 28 and 30 each formed on the outer side of the respective annular piston 10, 12. These pressure chambers 28, 30 are partly defined by the inner surfaces of the axial bores. A second cylinder cover 32 is provided in engagement with the second cylinder tube 8 at its axial end remote from the axial bore receiving the second annular piston 12. The first cylinder tube 6, fitting 18, second cylinder tube 8 and second cylinder cover 32 have mating recesses and bosses which engage with each other so that the individual members are axially connected in series and radially aligned relative to each other. These members 6, 18, 8 and 32 are fixed, with bolts 34 extending therethrough and nuts 36, to the rod-end cover (first cylinder cover 4) of the air cylinder assembly, whereby the cylinder 2 is provided as an integral unit. In this particular example of the cylinder unit, fluid tightness between the individual members is maintained through close contact of the mating end surfaces thereof which are finished by grinding. However, it is possible to use sealer members such as packings and O-rings for holding the members of the cylinder 2 in fluid-(pressure-) tight conditions.

The air cylinder assembly further comprises a shaft member in the form of a piston rod 38 which slidably extends axially of the cylinder 2 and the annular pistons 10, 12, penetrating the radially central portions thereof. Air tightness between this piston rod 38 and the cylinder 2 is maintained by sealers 40 and 42 provided in the first cylinder cover 4, and by another set of sealers 44 and 46 provided in the second cylinder cover 32. It is noted that the first cylinder cover 4 and/or second cylinder cover 32 serve(s) as bearing means for supportng the piston rod 38.

The second cylinder tube 8 has a central through-bore 48 in the central part of a radial portion terminating at its outer end into the cylindrical portion. The inner surface defining this through-bore 48 and the outer surface of the piston rod 38 cooperate to define therebetween an annular gap in which a cylindrical brake shoe 50 is accommodated. The annular brake shoe 50 has a slit 52, as illustrated in FIG. 2, which extends axially thereof and through the thickness of the annular wall so that the brake shoe 50 is C-shaped in transverse cross section and elastically deformable to a reduced diameter, i.e., radially inwardly contractible. In normal conditions, that is, while no stress is applied to the brake shoe 50, its outer circumferential surface of the brake shoe 50 is kept in contact with the inner surface of the second cylinder tube 8 defining the through-bore 48, and there exists a slight annular clearance between the inner circumferential surface of the brake shoe 50 and the outer surface of the piston rod 38. The brake shoe 50 is provided, at its one axial end, with an annular flange portion 54 which is fitted in a counterbore 56 formed at one end of the through-bore 48. The second cylinder cover 32 has an annular boss 58 protruding from the end surface mating the second cylinder tube 8. The annular flange portion 54 is squeezed on both sides thereof between the end of the annular boss 58 and the bottom surface of the counterbore 56, whereby the brake shoe 50 is fixed such that it is axially immovable relative to the cylinder 2.

The other axial end of the brake shoe 50 remote from the counterbore 56 is positioned within the outer pressure chamber 30. In other words, the brake shoe 50 extends at said other axial end a given distance from the surface of the central radial portion of the second cylinder tube 8 which partly defines the outer pressure chamber 30. This extended portion of the brake shoe 50 within the pressure chamber 30 engages a radial clamp member 60. As shown in FIG. 3, the radial clamp member 60 is an annular member having a central bore and made of a resilient sheet material so as to form a coned disc spring (belleville spring) having an annular conical surface which is inclined, as seen in FIG. 4, so that the axial distance from one end thereof is increased as it extends from the inner circumference toward the outer circumference. As shown in FIG. 3, the radial clamp member 60 has a plurality of circumferentially equiangularly spaced-apart inner radial slots 62 formed to extend from the inner circumference, and a plurality of outer radial slots 64 which are formed to extend from pressure chambers 28 and 30 is formed in the second cylinder tube 8 (A passage connecting the second port 16 and the outer pressure chamber 28 is not shown.). Hence, the same reference numerals are used in FIG. 5 to identify the corresponding elements, and a detailed description thereof will not be provided.

In this braking device of FIG. 5, the radial clamp members 74 and 60 are normally uncompressed in the axial direction, and consequently the brake shoes 72 and 50 are placed in their expanded position at which the piston rod 38 is axially movable. Thus, this braking device is of normally-released type. In other words, the outer pressure chambers 28 and 30 are normally pressurized and the pistons 10 and 12 are held in their inward brake releasing positions to keep the radial clamp members 74 and 60 free from axial compression between the pistons 12, 10 and the corresponding cylinder tubes 8, 6. However, the pressurization of the outer pressure chambers 28 and 30 for normal releasing of the clamp members 74 and 60 may be replaced by the provision of suitable resilient members between the first piston 10 and the first cylinder tube 6, and between the second piston 12 and the second cylinder tube 8, for normally keeping the pistons 10, 12 in their inward positions. In this alternative arrangement, the radial clamp members 72 and 50 are kept free from axial compression and the clamping forces applied to the brake shoes 72 and 50 are completely removed, without application of air pressure to the outer pressure chambers 28, 30.

Figure 7:
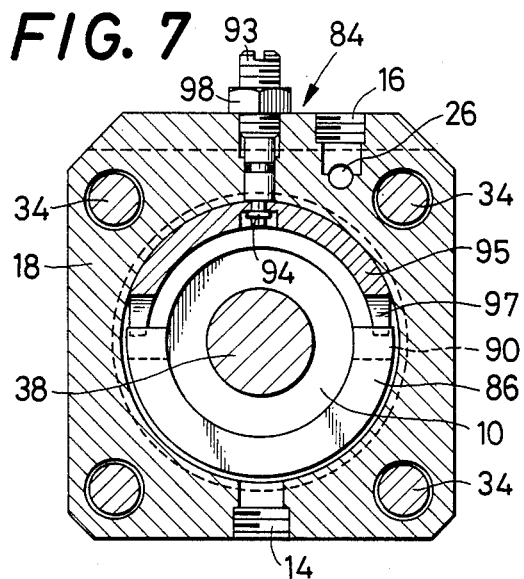
FIG. 7 is a side elevational view in cross section of the braking device of FIG. 6.
Figure 10:
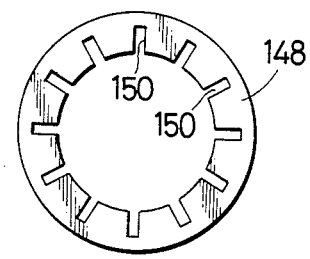

Referring to FIGS. 6 and 7, there is illustrated a modified embodiment of a braking device of normally-operated type as in the first embodiment of FIG. 1. The difference resides in the provision of a brake releasing device 84 which is used to release the arrested piston rod 38 by forcing the first and second pistons 10 and 12 to move toward each other to their inward brake releasing positions irrespective of the currently selected position of the directional control valve 80.

The same reference numerals as used in the preceding figures are used also in FIGS. 6 and 7 to identify the corresponding components.

In FIGS. 6 and 7, the first and second annular pistons 10 and 12 have opposed semi-annular lips 86 and 88 which axially extend toward each other from the radially outward portions (arcuate portion along the lower half of the circumference in FIG. 7) of their opposed faces. The semi-annular lips 86, 88 are provided, at their circumferential ends, with tapered surfaces 90, 92, respectively, which extend circumferentially of the lips 86, 88 as the surfaces 90, 92 come closer to each other in the axial direction. The fitting 18 has a tapped hole in which is threaded a lock screw 93 in perpendicular relation with the axis of the cylinder 2 (piston rod 38). The end of the lock screw 93 projecting in the cylinder 2 carries a retainer ring 94 through which a lock member 95 is connected to the lock screw 93 rotatably about its axis. Thus, the lock member 95 is movable upwardly (away from the axis of the cylinder 2) or downwardly (toward the axis) as viewed in FIGS. 6 and 7, when the lock screw 93 is turned in the appropriate directions. The lock member 95 takes the form of a semi-annular member which straddles the piston rod 38 and the compression coil spring 78 wound around the rod 38. Each circumferential end of this semi-annular lock member 95 is formed with a V-groove 97 defined by a pair of tapered surfaces which face, with a predetermined clearance, the tapered surfaces 90 and 92 of the semi-annular lips 86 and 88. Reference numeral 98 designates a lock nut for locking the lock screw 93.

In the above embodiment including the brake releasing device 84, a vertical movement (in the figures) of the lock member 95 to a position away from the axis of the cylinder 2 through rotation of the lock screw 93 will permit the first and second pistons 10 and 12 to be axially moved without interference with the lock member 95. In this position of the lock member 95, the braking device is placed in its operated position to arrest the piston rod 38. That is, the piston rod 38 is usually arrested, but released when the control valve 80 is actuated. FIGS. 6 and 7 show the operated position of the braking device with the lock member 95 held in its upper position (in the figures).

If the lock screw 93 is rotated to move the lock member 95 to a lower position (in the figures) near the axis of the cylinder 2, the tapered surfaces of the V-grooves 97 at the ends of the lock member 95 come into sliding pressing contact with the tapered surfaces 90, 92 at the ends of the semi-annular lips 86, 88 of the first and second annular pistons 10 and 12, and thereby force the pistons to move toward each other against the resilient force of the coil spring 78. Consequently, the clamping force applied to the brake shoes 50, 72 by the radial clamp members 60, 74 are removed, and the brakes applied to the piston rod 38 by the brake shoes 50, 72 are released regardless of the presently selected position of the solenoid-operated directional control valve 80.

Figure 8:
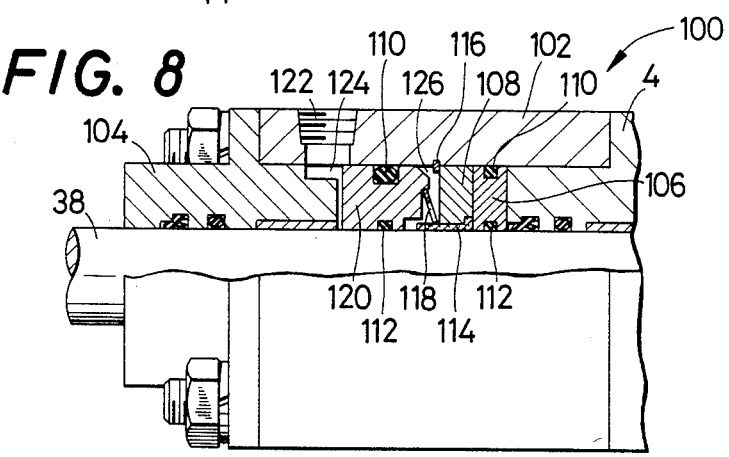
FIG. 8 is a front elevational view partly in cross section of another embodiment of the normally-released braking device.

A modified embodiment of a normally-released braking device is illustrated in FIG. 8, wherein numeral 4 designates a rod-end cover (cylinder cover) of an air cylinder assembly and numeral 38 indicates a piston rod of a cylinder 100. This cylinder 100 of the present embodiment comprises a cylinder tube 102 having a central bore, a cylinder cover 104 closing the cylinder tube 102 at one end thereof, a sealer plate 106 closing the cylinder tube 102 at the other end, and a shoe holder 108. The sealer plate 106 is an annular disc having a central through-bore and provided in its outer and inner circumferential surfaces with O-rings 110 and 112 to maintain air-tightness between the cylinder tube 102 and the piston rod 38. Therefore, the sealer plate 106 eliminates the need of finishing by grinding of the contacting end surfaces of the cylinder cover 4 and the cylinder tube 102 as required in the preceding embodiments. This provides an advantage of easy attachment of the instant braking device to an ordinary air cylinder assembly having an unground rod-end cover. The shoe holder 108 cooperates with the sealer plate 106 to hold a brake shoe 114 such that the brake shoe 114 is unable to axially move but able to contract in diameter. The shoe holder 108 and the sealer plate 106 are fixed in abutting contact with the cylinder cover and a C-shaped retainer ring 116 in the cylinder tube 102, respectively, so that they are not able to move in the axial direction relative to the cylinder tube 102. While a radial clamp member 118 and a piston 120 are provided in the cylinder tube 102, a detailed description thereof is omitted as they are similar to the corresponding parts used in the preceding embodiments.

Upon application of air pressure to a first pressure chamber 124 through a port 122, the piston 120 is moved toward the shoe holder 108 and axially compresses the radial clamp member 118, with a result of radially forcing the brake shoe 114 against the outer surface of the piston rod 38, whereby the moving piston rod 38 is arrested. On the other hand, pressurization of the outer circumference and circumferentially equiangularly spaced from each other so that they are located between the adjacent inner radial slots 62. The outer circumference of the radial clamp member 60 engages the surface of the second cylinder tube 8 which defines a counterbore 66 formed in the outer face of the second annular piston 12. As shown in FIG. 4, the second annular piston 12 further has a shallow annular groove 69 formed adjacent to a bottom surface 68 of the counterbore 66. The outer peripheral edge of the radial clamp member 60 is inserted in the annular groove 69 so that the peripheral edge is not displaced relative to the second annular piston 12 in the axial direction of the latter.

The brake shoe 50 and the radial clamp member 60 cooperate with the second annular piston 12 and the second cylinder tube 8 to constitute second braking means 70. Another brake shoe 72 and another radial clamp member 74 are provided adjacent to the first annular piston 10, and these three members 72, 74 and 10 cooperate with the first cylinder tube 6 to constitute first braking means 76.

Between the first and second annular pistons 10 and 12 is interposed a compression coil spring 78 with a suitable preload to bias the pistons 10 and 12 in opposite axial directions away from each other. With this arrangement, the radial clamp member 60 is axially compressed by and between the second cylinder tube 8 and the second annular piston 12. The radial clamp member 60 has the characteristics that its outside diameter is expanded and its inside diameter decreased upon axial compression. In this specific embodiment, however, the expansion of the outer circumference is limited by the surface defining the diameter of the counterbore 69, more precisely, by the bottom of the annular groove 69 formed adjacent to the bottom surface 68 of the counterbore 66. As a result, the reduction in the inner circumference of the radial clamp member 60 is achieved to a greater extent than the expansion of the outer circumference. The resultant contraction of the radial clamp member 60 at its inner circumference will contract the brake shoe 50 radially thereof, thereby forcing the inner surface of the brake shoe 50 against the outer surface of the piston rod 38, whereby the piston rod 38 is arrested, i.e., prevented from axially moving relative to the brake shoe 50. Since the brake shoe 50 is fixed to the second cylinder tube 8 and is unable to move relative to the cylinder 2, the piston rod 38 is prevented from axially moving relative to the cylinder 2. Similarly, the biasing force of the coil spring 78 causes an axial compression of the radial clamp member 74 of the first braking means 76, and the corresponding brake shoe 72 is forced against the circumference of the piston rod 38, whereby the piston rod 38 is arrested for prevention of its axial movement. As described above, the braking device of this embodiment is of a normally-operated type, that is, normally placed in its operated position, i.e., the piston rod 38 is normally arrested by the braking device.

The braking device constructed as described hitherto is used in connection with an air source 82 via a solenoid-operated directional control valve 80. The air source 82 may be the same source that is used to operate the air cylinder assembly to which the instant braking device is attached. In this case, the braking device will produce a braking force proportional to an operating force of the piston rod 38, because both the operating force and the braking force are proportional to an air pressure supplied by the common air source 82.

The directional control valve 80 is normally placed in a first position wherein the inner pressure chambers 22 and 24 are held in communication with the air source 82 and the outer pressure chambers 28 and 30 are open to the atmosphere. Consequently, the first and second braking means 76 and 70 are both kept in their operating position with the resilient force of the coil spring 78 and an air pressure in the inner pressure chambers 22 and 24, so as to keep the piston rod 38 arrested with a sufficient braking force. However, the pressure supply to the inner pressure chambers 22, 24 may be eliminated when the braking force required is not so great. In this instance, the control valve 80 may be advantageously replaced by a two-position, three-way directional control valve which is less costly.

When it becomes necessary to move the piston rod 38, the control valve 80 is operated to its second position wherein the outer pressure chambers 28 and 30 are held in communication with the air source 82 and the inner pressure chambers 22 and 24 are open to the atmosphere. As a result, the first and second pistons 10 and 12 are axially moved toward each other against the resiliency of the coil spring 78, and the axially compressed radial clamp members 74 and 60 are freed from axial compression with a result of expansion of the inner circumference. Accordingly, the brake shoes 72 and 50 are expanded toward their original diameters, and the piston rod 38 is released and allowed to move in its axial direction. This release operation of the piston rod 38 requires only very small operating strokes of the pistons 10 and 12. Therefore, the outer pressure chambers 28 and 30 may be designed with a small volume. This means a less operational time lag of the braking device due to compressibility of air, that is, a high response of the braking device.

When it becomes necessary to stop or arrest the piston rod 38 again when it has moved to an intended position, the solenoid of the control valve 80 is deenergized and the control valve 80 is returned to its original first position of FIG. 1. Thus, the outer pressure chambers 28 and 30 are open to the atmosphere, and the inner pressure chambers 22 and 24 are put into communication with the air source 82. As a result, the annular pistons 10 and 12 are moved away from each other, and the brake shoes 72 and 50 are contracted by the respective radial clamp members 74 and 60 under axial compression. Therefore, the first and second braking means 76 and 70 are both restored to their operated position, thus arresting the piston rod 38 at the intended axial position. For the reasons previously stated, a high response is also obtained at this moment of arresting the piston rod 38.

As is apparent from the foregoing description, a pressurized-fluid supply device including the air source 82 and the control valve 80, cooperates with the compression coil spring 78 to constitute piston drive means for axially moving the first and second pistons 10 and 12 through controlled selective supply of the pressurized fluid to the cylinder 2.

Referring next to FIG. 5, there is shown another embodiment of a braking device of the invention which, like the braking device of the preceding embodiment, applies a brake to the piston rod 38 of the cylinder 2 to prevent its axial movement. The two embodiments are substantially the same in construction, except that the present embodiment of FIG. 5 has no compression coil spring between the first and second pistons 10 and 12, and that a second port 16 communicating with the outer a second pressure chamber 126 through a port (not shown) will cause the piston 120 to return or move away from the shoe holder 108, allowing the piston rod 38 to axially move relative to the cylinder tube 102.

Figure 9:
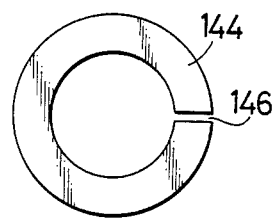
FIGS. 9 and 10 are front views in elevation of modified radial clamp members alternative to the clamp member of FIG. 3.

While the present invention has been described in its typical preferred embodiments, the invention may be otherwise embodied. For example, an ordinary coned disc or belleville spring may be used as a radial clamp member. It is also possible to use a radial clamp member 144 which is an ordinary coned disc spring provided with a radial slit 146 formed to extend between the inner and outer circumferences, as shown in FIG. 9. It is further possible to use a radial clamp member 148 which is a coned disc spring provided with a plurality of circumferentially equiangularly spaced-apart radial slots formed to extend from the inner circumference. This latter radial clamp member 148 which is circumferentialy continous at its outer peripheral portion, tends to have a reduced expansion of its outside diameter and a comparatively larger degree of contraction of its inside diameter. This will eliminate the need of providing a piston with a counterbore for restricting the expansion of the outside diameter. In addition, the radial clamp member may have various configurations other than those described above. It is also appreciated to use two or more radial clamp members in series arrangement.

Figure 11:
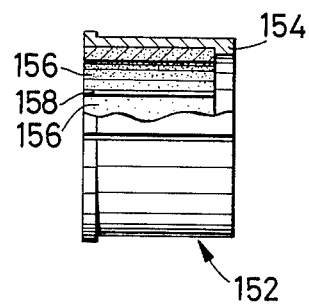
FIG. 11 is a front elevational view partly in cross section of a modified brake shoe alternative to the brake shoe of FIG. 2.

Similarly, modifications of the brake shoes are possible. For example, a brake shoe 152 shown in FIG. 11 may be used, which comprises an outer sleeve 154 similar in shape to the brake shoe 50 of the first embodiment, and a cylindrical lining which are divided into a plurality of lining elements 156 by plural axial slits 158 which are spaced from each other circumferentially of the cylindrical lining. These lining elements 156 are accommodated within the outer sleeve 154 such that they are spaced from each other circumferentially of the sleeve 154, i.e., separated from each other by plural parallel axial clearances corresponding to the axial slots 158 when the brake shoe 152 is installed in position. This brake shoe 152 is advantageous in that different suitable materials may be selected for the outer sleeve 154 and the lining elements 156; the outer sleeve 154 may be made of a material excellent in strength and resiliency, and the lining elements 156 may be made of synthetic resin, gun metal, asbestos, or other materials which easily run in with (conform to) the surface contour of the piston rod 38 and have less possiblity of scoring or scratching its surface. The brake shoe need not be capable of expanding by its own resiliency, and may consist of a plurality of circumferentially spaced frictional pieces, which as a whole, constitute a generally cylindrical form of brake shoe arrangement that is contractible to a reduced diameter. Further, means for preventing axial movements of the brake shoe relative to the cylinder is not limited to the annular flange portion 54 used in the previous embodiment, but may be a combination of a radial hole formed in the outer surface of the cylinder, and a screw or similar piece which is threaded in or secured to the cylinder and engages the radial hole in the cylinder.

While the cylinder 2, 100 in the foregoing embodiments is fed with an air pressure supplied directly from the air source 82 (air source for the air cylinder assembly to which the cylinder 2, 100 is attached), a booster may be provided to supply a boosted pressure to the cylinder 2, 100 for obtaining an increased braking force. Further, the cylinder 2, 100 may be hydraulically operated, that is, the working fluid used may be a hydraulic oil.

Although the directional control vavle 80 shown in FIG. 1 is provided separately from the cylinder 2, it is possible to incorporate such a control vavle in the structure of the cylinder 2, 100.

It is appreciated that the axial braking device according to the invention is secured to a movable member which is supported and guided by a guide rod or rods, to arrest the movable member at a desired axial position along the guide rod.

It is to be understood that other modifications and changes will occur to those skilled in the art without departing from the scope of the invention defined by the following claims.

What is claimed is:

1. An axial braking device for arresting a relative movement between bearing means, and a shaft member slidably engaging the bearing means and movable axially thereof relative to the bearing means, said axial braking device comprising:

a cylinder which is disposed immovably along an axis thereof relative to said bearing means, and through which said shaft member extends along said axis;

first and second braking means associated with said cylinder for braking said shaft, said first and second braking means being substantially identical and disposed symetrically relative to each other on opposite sides of a plane perpendicular to the axis of the shaft member, each of said first and second braking means including an annular piston having a central bore to define an inner surface thereof and received within said cylinder, said annular piston engaging said cylinder fluid-tightly and slidably at an outer surface thereof and further engaging said shaft member fluid-tightly and slidably at said inner surface;

a cylindrical brake shoe having at least one slit formed axially thereof and through a wall thickness thereof, and radially contractible, said cylindrical brake shoe slidably engaging said shaft member and being disposed immovably relative to said cylinder along said axis thereof;

a radial clamp member of generally coned disc shape made of a resilient material, and engaging the outer surface of said cylindrical brake shoe, said radial clamp member being compressible in a direction along the axis of said cylinder by said annular piston and thereby reduced in inside diameter thereof so as to radially force the inner surface of said cylindrical brake shoe against the outer surface of said shaft member;

piston drive means for moving the annular pistons of said first and second braking means along the axis of said shaft member, said piston drive means comprising a spring which is interposed between the annular pistons of said first and second braking means to bias said annular pistons in opposite directons away from each other along said axis so as to cause axial compression of the respective radial clamp members, and further comprising a pressurized-fluid supply device for effecting a controlled selective supply of a pressurized fluid to said cylinder, said pressurized-fluid supply device having an operating position for moving said annular pistons against a biasing force of said spring and thereby releasing said radial clamp members from said axial compression by said annular pistons, and a non-operating position for applying a brake to said shaft member through the cylindrical brake shoes; and a brake releasing device comprising a single lock screw which is threaded in one of said cylinder and a member fixed thereto, in a direction perpendicular to the axis of said shaft member, said brake releasing device further comprising a lock member which is disposed between opposed ends of said annular pistons and is connected to said lock screw so that the lock member is movable in said perpendicular direction to a locking position upon rotation of said lock screw in one direction, said lock member having tapered surfaces which slidably contact mating tapered surfaces of said annular pistons formed at said opposed ends thereof when said lock member is moved to said locking position, said lock member thereby forcing said annular pistons to move toward each other against the biasing force of said spring, and locking said annular pistons in their brake-releasing positions to keep said radial clamp members free from said axial compression to release said shaft member regardless of the operating and non-operating positions of said pressurizied-fluid supply device.

2. An axial braking device as set forth in claim 1, wherein said radial clamp member has a plurality of circumferentially spaced-apart inner radial slots formed to extend from the inner circumference.

3. An axial braking device as set forth in claim 2, further having a plurality of circumferentially spaced-apart outer radial slots formed to extend from the outer circumference.

4. An axial braking device as set forth in claim 1, wherein said radial clamp member has a radial slit formed to extend between its inner and outer circumferences.

5. An axial braking device as set forth in claim 1, wherein said cylindrical brake shoe is C-shaped, having one slit formed along its axis and through its wall thickness.

6. An axial braking device as set forth in claim 1, wherein said cylindrical brake shoe comprises a cylindrical lining, and a resiliently contractible outer sleeve which accommodates said cylindrical lining and engages the inner circumference of said radial clamp member, said cylindrical lining being divided into a plurality of lining elements by plural parallel axial slits which are spaced from each other circumferentially of the cylindrical lining.

7. An axial braking device, as set forth in claim 1, wherein said shaft member is a piston rod of an air cylinder assembly, and said cylinder fixedly engages a rod-end cover of said air cylindner assembly.

8. An axial braking device, as set forth in claim 7, wherein said cylinder includes a cylinder tube having a central bore, and a sealer plate, said rod-end cover engaging said cylindrical tube at one end of said central bore, said sealer plate being fitted in said central bore to maintain fluid-tightness between said cylinder tube and said rod-end cover.

9. An axial braking device, as set forth in claim 1, wherein said opposed ends of said annular pistons have opposed semi-annular lips which extend toward each other, said semi-annular lips being provided at each circumferential end thereof with said mating tapered surfaces, said lock member comprising a semi-annular member which straddles said shaft member, said semi-annular member having at each circumferential end a V-groove which slidably contacts said mating tapered surfaces of said opposed semi-annular lips when said lock member is moved to said locking position.

* * * * *